Patented June 29, 1926.

1,590,306

UNITED STATES PATENT OFFICE.

ALOYSIUS E. MAGERS, OF DENVER, COLORADO, ASSIGNOR TO SAN-A-HAM COMPANY, OF FORT WAYNE, INDIANA, A CORPORATION.

ART OF MANUFACTURING MEAT PRODUCTS.

No Drawing. Application filed January 29, 1926. Serial No. 84,761.

The invention relates to the art of manufacturing meat products. Heretofore, as far as I am aware, the practice generally followed in preparing many meat products, is to grind the ingredients in a cold condition so as to avoid souring of the product, since the heat generated in the grinding operation was found to be harmful.

Generally a gelatigenous tissue, such as pork skin, or other parts of animals yielding gelatine, is used in some meat products to form a gelatinous body for the product. This gelatigenous tissue is chopped into pieces, either while cold or after it has been cooked only partially through, and mixed with the other ingredients entering into the product, which ingredients are also cold or have been cooked partially to make possible the easy removal of the bones therefrom. The mixture is then fully cooked. The gelatigenous tissue is not entirely reduced by the heating operation so that it remains in a more or less solid condition.

I have found after extensive experiments that by cooking the gelatigenous tissue with the selected ingredients of the meat product in water for a selected period of time or until they are tender, that a portion of the gelatine leaves the gelatigenous tissue and causes the liquid to become a somewhat viscous liquor. The gelatigenous tissue is not entirely reduced and that remaining is swollen and soft. While maintaining a sufficient heat to the mixture I strain out the meat products and grind them to the selected degree of fineness and set the ground mass aside. I then strain out the hot unreduced gelatigenous tissue and grind it, the ground mass being dropped from the grinder directly into the hot liquor in which it was cooked and constantly stirred as it enters the liquor to prevent the mass from forming into lumps. The ground gelatigenous tissue drops into the said hot liquor in the form of fine particles and stirring the mass maintains the particles in a separated condition. The ground meat products and the ground gelatigenous tissue mixture are mixed together with the remaining liquor and with any other ingredients that may be desirable in the way of seasoning, flavoring or coloring. The final mixture is then placed in pans to cool. The resultant product is sealed, as it were, against souring and has a most desirable gloss.

I have also found that a most desirable product is made when I first cure the gelatigenous tissue, by applying to it a suitable curing agent and permitting it to stand in this condition for a selected period of time. The cured gelatigenous tissue seems to increase the preservative quality of the product, and also improves the taste thereof.

As an illustrative example of the operation of the process I may produce a delicious meat product, in the following manner: viz:

I place 30 pounds of smoked pork shoulders or ham, cut up in chunks, into a kettle; on top of that pork I then place 10 pounds of pork skin, preferably cured, but from which the curative agent has been thoroughly washed out; then add 60 pounds of veal, cut up in chunks, on top of the pork skin; then add about 6 ounces of salt and cover the mass with water. I then apply heat to the vessel for a sufficient length of time to cook the mass until all the meat and pork skin are tender. After this point has been reached the heat is maintained sufficiently to keep the liquid near boiling temperature. The cooked meat is then strained out, a small quantity at a time so as not to cool it too much, and ground while hot. The hot pork skin is then strained out and a sufficient portion of the hot liquor in which it was cooked is transferred from the kettle to a suitable receptacle and the hot pork skin is ground up, the ground hot pork skin dropping directly from the grinder into the said portion of hot liquor, the mixture being constantly stirred simultaneously therewith. I then take a quantity of flavoring material, such as pimentos, and grind it into another quantity of the said hot liquor. I then mix the ground meat and the mixture of pork skin and liquor together, and add the pimento mixture, and chopped up sweet pickles may be added, and any remainder of the hot liquor is added to the mixture and the whole is mixed thoroughly. The final mixture is then placed in pans to cool and use. The product remains sweet for a considerable period of time.

The grinding of the hot gelatigenous tissue and the return of the same to and mixing with the hot liquor in which it was cooked, is an important step in the process, as it is believed that this step prevents souring of the final product. The curing of the said tissue initially is valuable, but it is not an essential step, as I have used fresh tissue successfully in the product. However, I prefer to cure the gelatigenous tissue since the resultant meat product apparently keeps better than where the fresh tissue is used.

What I claim is:

1. The process of producing meat products which consists in cooking selected meat ingredients and gelatigenous tissue, grinding the said hot ingredients and the said hot tissue separately and mixing the same together while hot.

2. The process of producing meat products which consists in cooking selected meats and cured gelatigenous tissue together, removing the hot meats from the cooked mass and grinding the same while hot, removing the hot gelatigenous tissue from the cooked mass and grinding the same while hot and mixing the ground meats and the said ground tissue while hot.

3. The process of producing meat products which consists in mixing with hot meat ground while hot, a hot preservative formed by heating a gelatigenous tissue in water to release therefrom a portion of the gelatine to form a hot viscous liquor, and grinding up the unreduced gelatigenous tissue while hot and simultaneously mixing it with the hot liquor.

4. The process of producing meat products which consists in heating a combination of gelatigenous tissue, meat and water until the solids are tender and a portion of gelatine is released into the water forming a viscous liquor; then straining out and grinding the hot meat; then straining out the hot unreduced gelatigenous tissue from the liquor, grinding such tissue while hot and simultaneously returning the hot ground tissue to the hot liquor and mixing the same therewith and finally mixing the ground meat with the mixture of the ground gelatigenous tissue and the liquor.

5. The process of producing meat products which consists in heating a combination of cured gelatigenous tissue, meat and water until the solids are tender and a portion of gelatine is released into the water and forming a viscous liquor; then straining out and grinding the hot meat; then straining out the hot unreduced gelatigenous tissue from the liquor, grinding it while hot and simultaneously returning the hot ground tissue to the hot liquor and mixing the same therewith and finally mixing the ground meat with the mixture of the ground gelatigenous tissue and the liquor.

6. The process of producing meat products which consists in heating meat in the presence of pork skin and water until the solids are tender and a portion of the gelatine of the pork skin is released into the water forming a viscous liquor, then removing and grinding the meat while hot, then removing the hot unreduced pork skin from the liquor and grinding it while hot, the said hot pork skin as ground being simultaneously deposited into the hot liquor in which it was heated and simultaneously stirred into the same, then finally mixing the hot ground meat and the hot mixture of ground pork skin and hot liquor with any remainder of the hot liquor.

In witness whereof I have hereunto set my hand this 15th day of January, 1926.

ALOYSIUS E. MAGERS.